(12) United States Patent
Uto et al.

(10) Patent No.: US 8,056,302 B2
(45) Date of Patent: Nov. 15, 2011

(54) DOOR PANEL

(75) Inventors: Ryoji Uto, Tokyo (JP); Isao Yoshijima, Ono (JP)

(73) Assignee: Caterpillar S.A.R.L., Geneva (CH)

( * ) Notice: Subject to any disclaimer, the term of this patent is extended or adjusted under 35 U.S.C. 154(b) by 258 days.

(21) Appl. No.: 12/516,849

(22) PCT Filed: Jul. 4, 2008

(86) PCT No.: PCT/JP2008/062163
§ 371 (c)(1),
(2), (4) Date: May 29, 2009

(87) PCT Pub. No.: WO2009/041140
PCT Pub. Date: Apr. 2, 2009

(65) Prior Publication Data
US 2010/0000180 A1    Jan. 7, 2010

(30) Foreign Application Priority Data

Sep. 27, 2007   (JP) .................................. 2007-252535

(51) Int. Cl.
*E06B 3/70* (2006.01)
*B62D 25/10* (2006.01)

(52) U.S. Cl. ................. 52/784.1; 52/784.13; 52/784.15; 52/794.1; 296/146.5; 296/146.6; 244/129.5; 114/117

(58) Field of Classification Search ............... 52/309.9, 52/784.1, 784.12, 784.13, 784.15, 794.1, 52/782.1, 783.1, 783.11, 783.12, 83.14, 792.1, 52/799.1, 7; 49/501, 502; 296/146.1, 146.5, 296/146.6, 146.7, 187.1; 89/36.08; 109/64, 109/76; 428/71, 213, 215, 216; 244/129.5; 29/897.32; 114/117; 454/184

See application file for complete search history.

(56) References Cited

U.S. PATENT DOCUMENTS 4,369,608 A * 1/1983 Miura et al. .................. 52/309.9
4,411,466 A * 10/1983 Koike ......................... 296/146.6
(Continued)

FOREIGN PATENT DOCUMENTS
JP        09228412       9/1997
(Continued)

OTHER PUBLICATIONS

Chinese Patent Application 200880000953.0: Office Action dated May 18, 2011.

*Primary Examiner* — Brian Glessner
*Assistant Examiner* — Beth Stephan
(74) *Attorney, Agent, or Firm* — McDermott Will & Emery LLP

(57) ABSTRACT

A door panel that is capable of maintaining the adhering strength of the adhesive is provided. An outer panel and an inner panel are joined together by an adhesive. Adhesive retaining portions, each of which includes an adhesive retaining channel for retaining the adhesive, are provided in adhering portions of the inner panel. Each adhering portion includes vertically extending portions, and the adhesive retaining portions of the inner panel are formed in the shape of an extended raised portion and extend vertically in the respective vertically extending portions of the adhering portions, along ventilation openings, which are formed at locations corresponding to groups of ventilation holes of the outer panel. Each adhesive retaining portion is provided at the middle of each vertically extending portion of the adhering portions so as to be flanked by adhesion margins of identical width.

5 Claims, 17 Drawing Sheets

U.S. PATENT DOCUMENTS

| | | | |
|---|---|---|---|
| 4,719,689 A | | 1/1988 | Yamamoto et al. |
| 5,322,722 A | * | 6/1994 | Rozenberg .................. 428/40.1 |
| 5,667,868 A | * | 9/1997 | Freeman ....................... 428/120 |
| 5,709,053 A | * | 1/1998 | Kuroda ........................... 52/145 |
| 6,619,724 B2 | * | 9/2003 | Bomeling et al. ......... 296/146.5 |
| 6,767,049 B1 | * | 7/2004 | Morrison et al. .......... 296/146.7 |
| 6,991,278 B2 | * | 1/2006 | Hockenberry et al. .... 296/146.7 |
| 7,055,887 B2 | * | 6/2006 | Williams et al. ........... 296/146.7 |
| 2001/0030444 A1 | * | 10/2001 | Whitehead et al. ........ 296/146.7 |
| 2006/0144014 A1 | | 7/2006 | Yoon et al. |

FOREIGN PATENT DOCUMENTS

| | | |
|---|---|---|
| JP | 2000192506 | 7/2000 |
| JP | 2007513016 | 5/2007 |

* cited by examiner ated Sep. 27, 2007. The International Application was published on Apr. 2, 2009 as International Publication No. WO/2009/041140 under PCT Article 21(2). The contents of the above applications are incorporated herein in their entirety.

DOOR PANEL

CROSS REFERENCED TO RELATED APPLICATION

This is a U.S. national phase application under U.S.C. §371 of International Patent Application No. PCT/JP2008/062163, filed Jul. 4, 2008 and claims the benefit of Japanese Application No. 2007-252535, filed Sep. 27, 2007. The International Application was published on Apr. 2, 2009 as International Publication No. WO/2009/041140 under PCT Article 21(2). The contents of the above applications are incorporated herein in their entirety.

TECHNICAL FIELD

The present invention relates to a door panel that is provided with an outer panel and an inner panel.

BACKGROUND OF THE INVENTION

FIG. 18 illustrates a hydraulic excavator 10, which is a work machine. The hydraulic excavator 10 includes a lower structure 11, an upper structure 12, a cab 13, a work equipment 14, and a power system 15 that includes an engine. The cab 13, the work equipment 14, and the power system 15 are mounted on the upper structure 12, which is rotatably mounted on the lower structure 11. The power system 15 is covered by a top cover 16, side doors 17,18, and other such components. The side doors 17,18 are mounted by hinges, which will be explained later, so as to be capable of opening and closing, and secured in the closed state by means of a latching device 19.

Examples of conventional side doors 17,18 of a work machine include a door panel with a double-panel structure including an outer panel and an inner panel. When producing such a door panel, the inner panel is fixed to the outer panel by the adhering strength of an adhesive, and the adhering surfaces of the outer panel and the inner panel to which the adhesive is applied are uniformly flat surfaces (e.g. See Japanese Laid-open Patent Publication No. 9-228412 (page 3, and FIG. 7)).

As the adhering surfaces of the outer panel and the inner panel of the conventional side door described above are flat surfaces, the adhesive may become completely flattened at some areas where there is little remaining adhesive, resulting in reduction in the adhering strength of the adhesive.

This presents a particularly serious problem in the case of a door designed with high-heat tolerance, because such a door requires openings, and the region around the openings is prone to not only reduction in the strength but also reduction in the remaining area of the adhering surfaces, making it difficult to maintain the adhering strength of the adhesive and impairing the integrity of the entire door panel.

In order to solve the above problems, an object of the invention is to provide a door panel that is capable of maintaining the adhering strength of the adhesive. Another object of the invention is to provide a door panel that includes openings for high-heat resistance and is capable of maintaining the adhering strength of the adhesive and preventing reduction in the strength around the openings.

SUMMARY OF THE INVENTION

The present invention relates to a door panel provided with an outer panel and an inner panel affixed to the inner surface of the outer panel. The inner panel includes an adhering portion and an adhesive retaining portion. The adhering portion is bonded to the outer panel by an adhesive, and the adhesive retaining portion has an adhesive retaining channel for retaining the adhesive.

According to the present invention, the door panel of the present invention has additional features, such as the adhering portion of the inner panel includes a vertically extending portion, and the adhesive retaining portion continuously extends in the vertically extending portion of the adhering portion.

According to the present invention, the adhesive retaining portion of the door panel is provided at the middle of the vertically extending portion of the adhering portion.

The present invention has additional features, such as the outer panel has a plurality of ventilation holes; the inner panel has a ventilation opening formed at a location corresponding to the plurality of ventilation holes of the outer panel; and the adhesive retaining portion of the inner panel is formed in the shape of a continuously extended raised portion in the adhering portion and extends vertically along the ventilation opening.

The adhesive retaining channel of the adhesive retaining portion of the door panel according to the present invention has a substantially arc-shaped cross section with such dimensions that the proportion of the height to the width thereof is in the range from ½ to ¼.

The adhesive retaining portion of the door panel according to the present invention has a rising portion at which the adhesive retaining portion rises from the adhering portion, the rising portion having a cross section in the shape of a concave arc.

According to the present invention, the adhering portion of the inner panel is bonded to the outer panel with the adhesive and is provided with an adhesive retaining portion that includes an adhesive retaining channel for retaining the adhesive. With the configuration as above, when the inner panel is pressed against the outer panel, the adhesive forced out from between the outer panel and the adhering portion of the inner panel remains in the adhesive retaining channel of the adhesive retaining portion. Therefore, when the adhesive hardens, the adhering strength of the adhesive is maintained.

According to the present invention, the adhesive retaining portion, which continuously extends in the vertically extending portion of the adhering portion, also serves as a column and thereby increases the strength of the door panel to withstand a vertical load.

According to the present invention, as the adhesive forced out from between the outer panel and the adhering portion of the inner panel can be evenly retained in the adhesive retaining portion, which is provided at the middle of the vertically extending portion of the adhering portion, the adhering portion of the inner panel is enabled to uniformly and evenly adhere to the outer panel.

According to the present invention, in cases where the inner panel is provided with a ventilation opening at a location corresponding to the ventilation holes of the outer panel in order to withstand severe heat, the adhesive can be retained in the adhesive retaining portion, which is formed in the shape of a continuously extended raised portion and extends along the ventilation opening in the adhering portion. Therefore, as the adhering strength of the adhesive is maintained in spite of a limited adhering area, increased strength is ensured. The adhesive retaining portion, which is formed in the shape of a continuously extended raised portion and extends along the ventilation opening in the adhering portion, also increases the strength of the adhering portion and thereby prevents reduction of the strength around the ventilation opening.

According to the present invention, as the adhesive retaining channel, which has a substantially arc-shaped cross section with dimensions of the height and width being represented by height/width=½ to ¼, is a flattened space with a limited height, the adhesive that has been forced out from between the outer panel and the adhering portion of the inner panel into the adhesive retaining channel remains where it has been forced and becomes solidified therein. Therefore, the adhering strength of the adhesive is assuredly maintained.

According to the present invention, the rising portion of the adhesive retaining portion has a cross section in the shape of a concave arc, and a slight gap that gradually becomes wider is formed between the outer panel and the rising portion of the adhesive retaining portion. As the adhesive readily remains in the gap formed by the rising portion, the adhering strength of the adhesive is assuredly maintained.

DETAILED DESCRIPTION OF THE INVENTION

Figure 13:
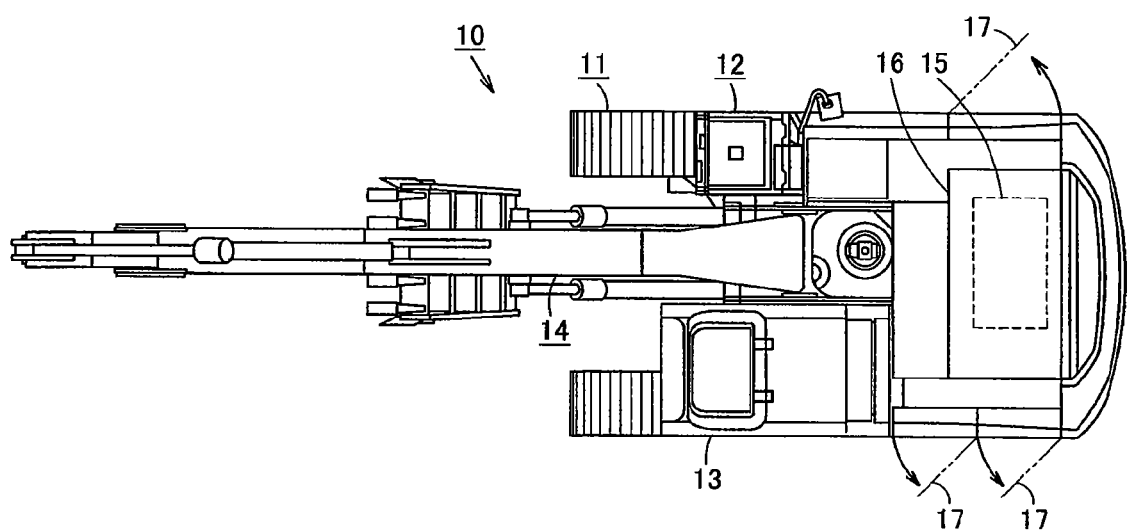
FIG. 13 is a plan view of a work machine provided with the door panel.
Figure 14:
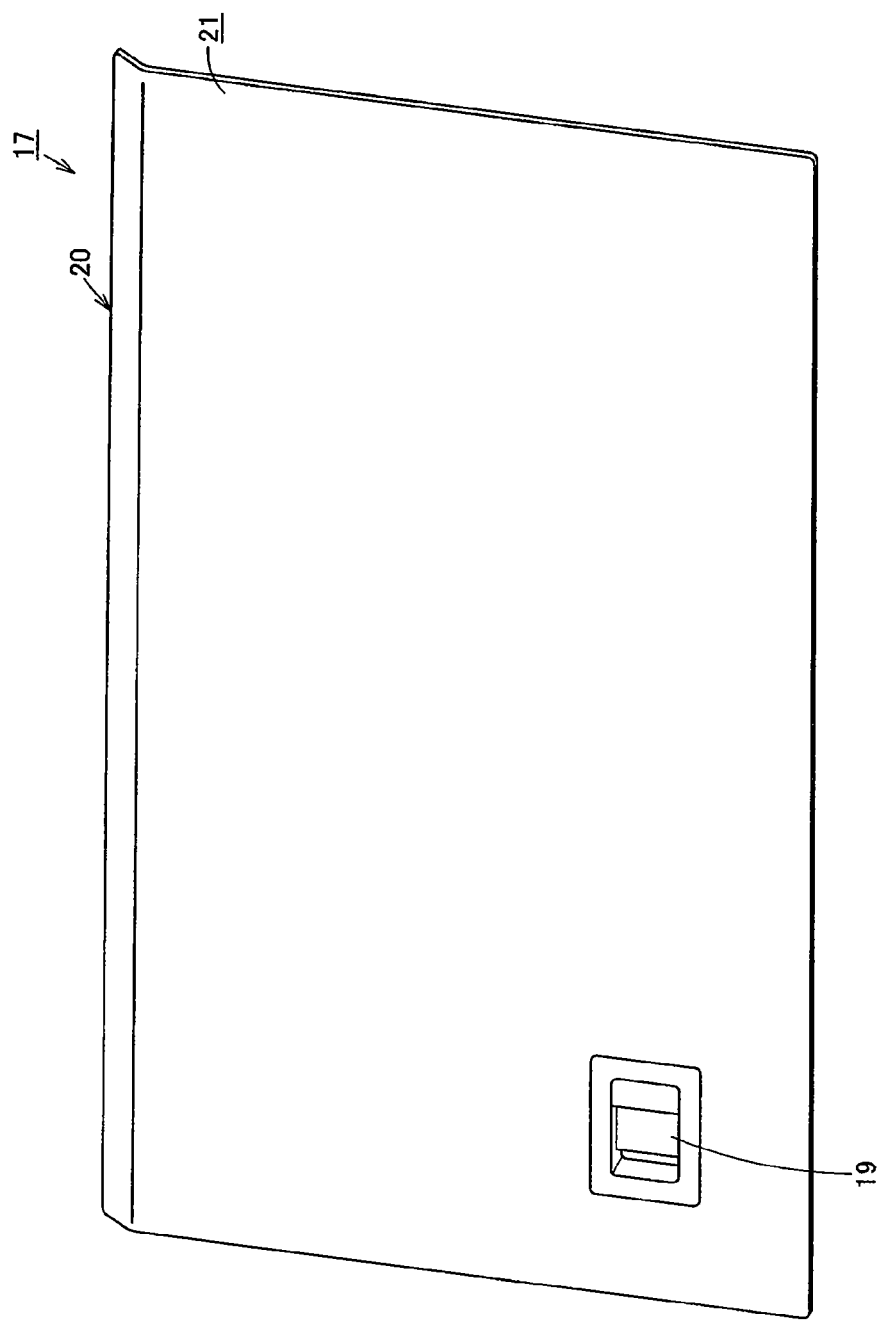
FIG. 14 is a perspective view of the outer face of a door panel according to another embodiment of the present invention.
Figure 15:
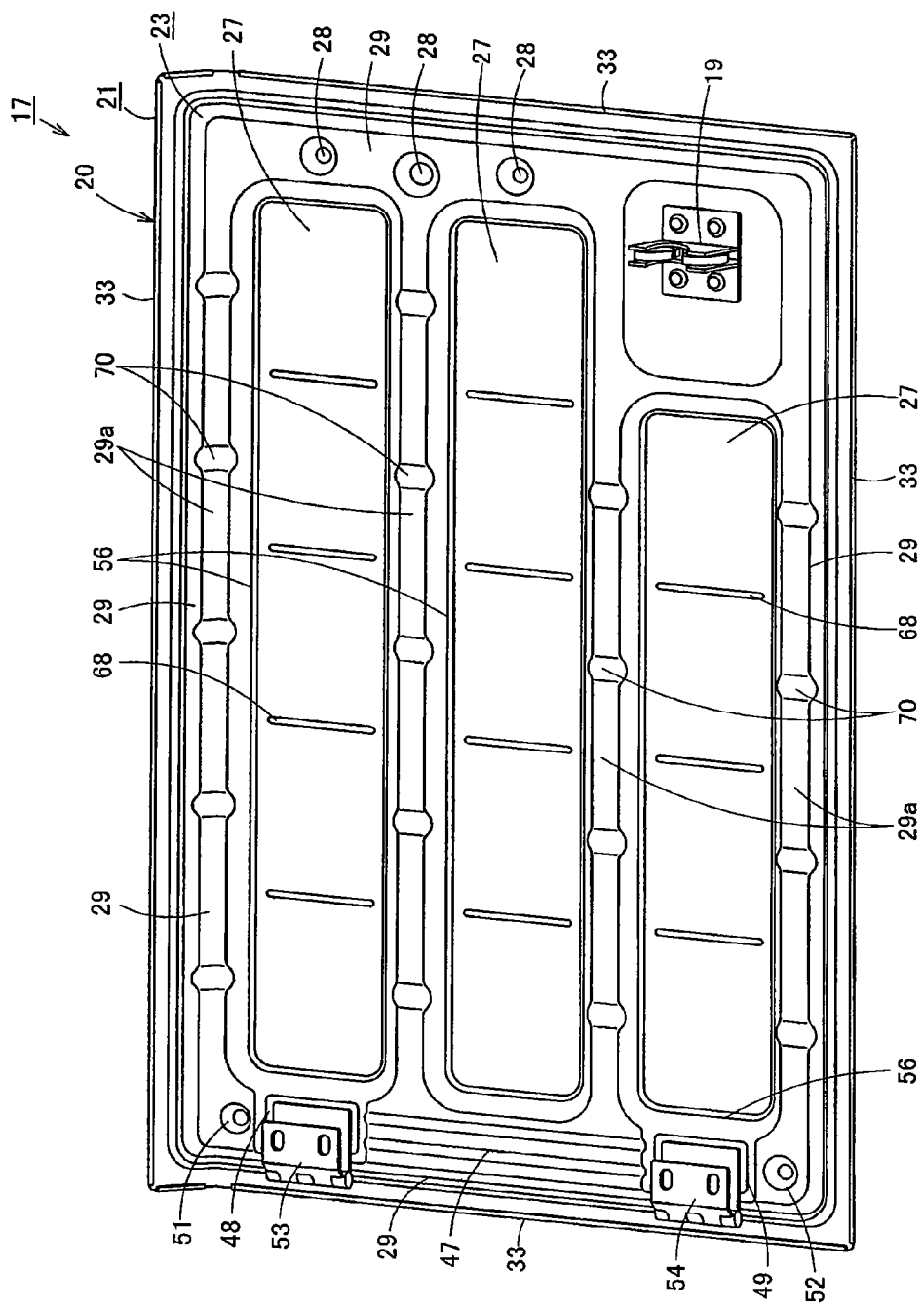
FIG. 15 is a perspective view of the inner face of the door panel.
Figure 16:
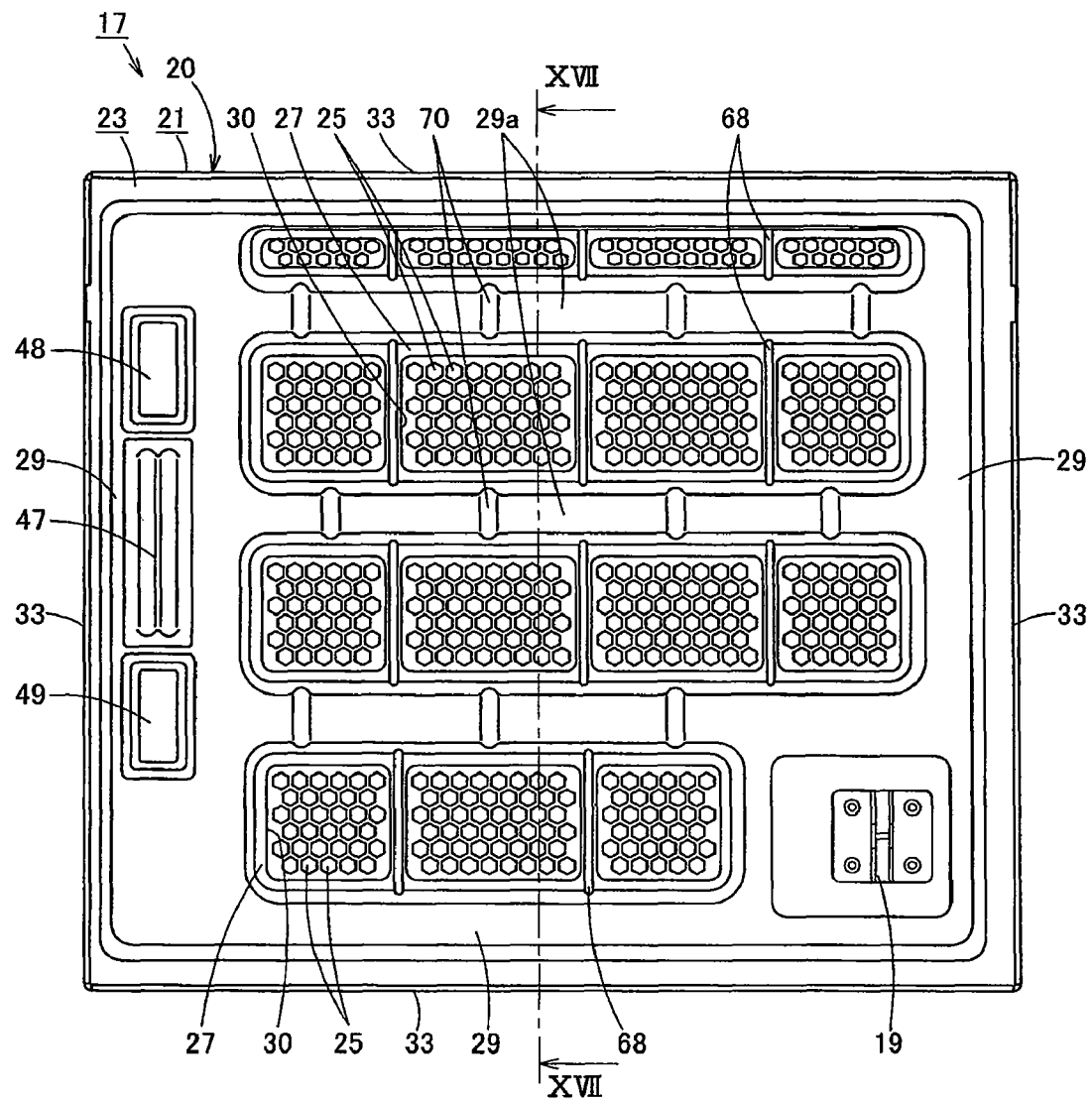
FIG. 16 is an internal view of a door panel according to a further embodiment of the present invention.
Figure 17:
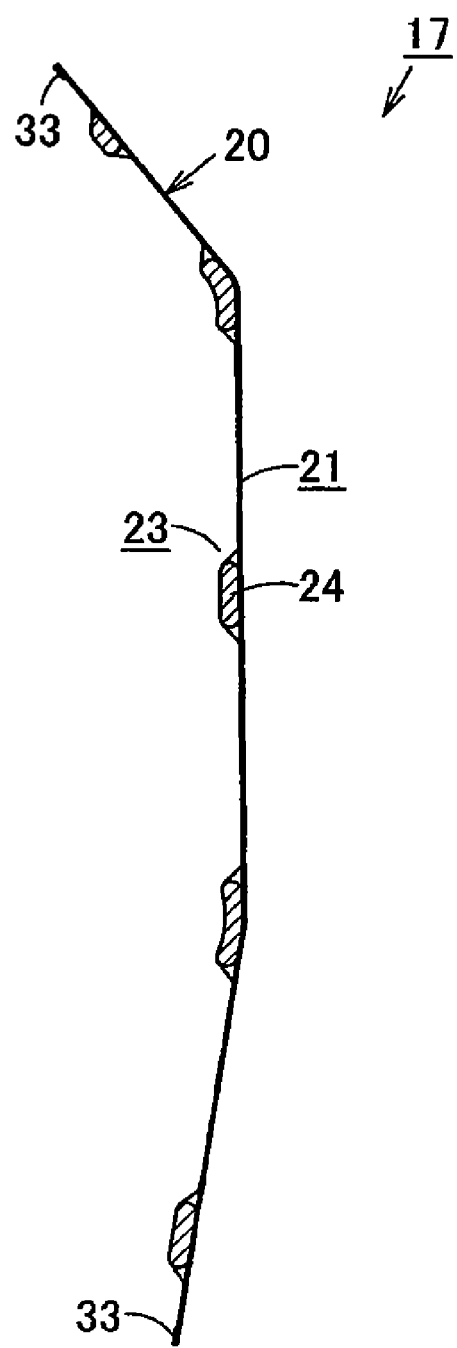
FIG. 17 is a sectional view taken along the line XVII-XVII of FIG. 16.

Next, the present invention is explained in detail hereunder, referring to an embodiment thereof shown in FIGS. 1 to 13, another embodiment thereof shown in FIGS. 14 and 15, and a further embodiment thereof shown in FIGS. 16 and 17.

FIG. 13 illustrates a hydraulic excavator 10, which is a work machine. The hydraulic excavator 10 includes a lower structure 11, an upper structure 12, a cab 13, a work equipment 14, and a power system 15 that includes an engine. The cab 13, the work equipment 14, and the power system 15 are mounted on the upper structure 12, which is rotatably mounted on the lower structure 11. The power system 15 is covered by a top cover 16, side doors 17, and other such components. Each side door 17 is mounted by hinges, which will be explained later, so as to be capable of opening and closing, and maintained in the closed state by means of a latching device that will be explained later.

Figure 3:
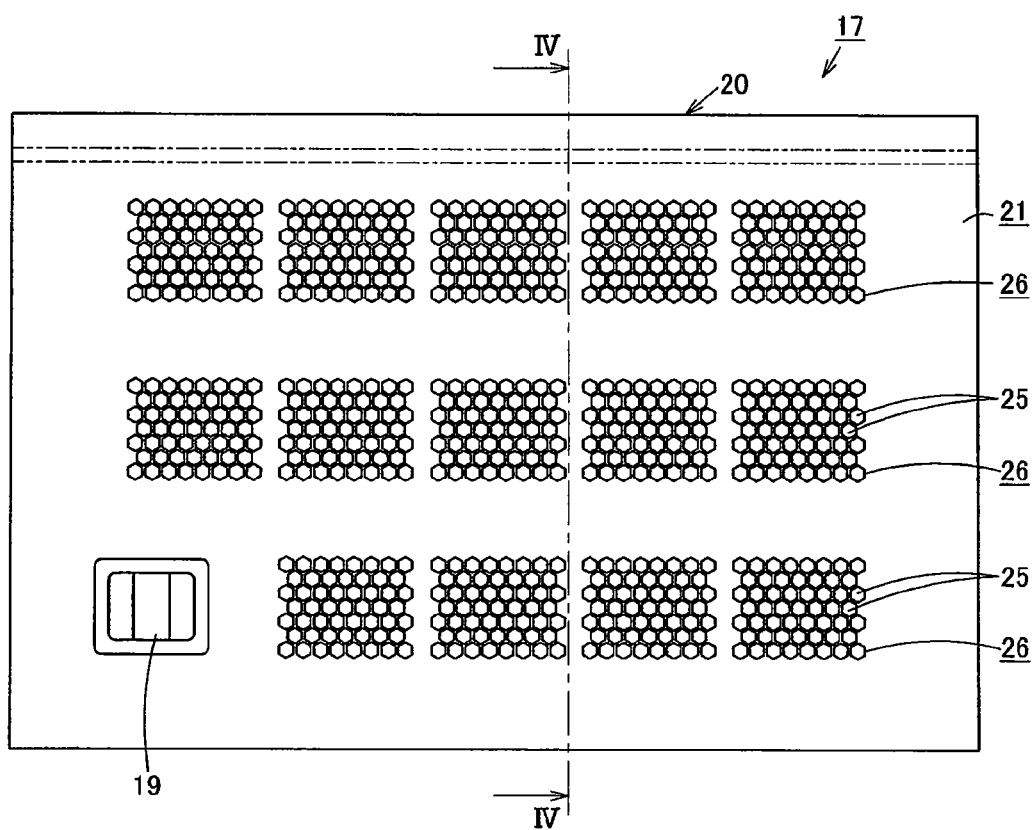
FIG. 3 is an external view of the door panel.
Figure 4:
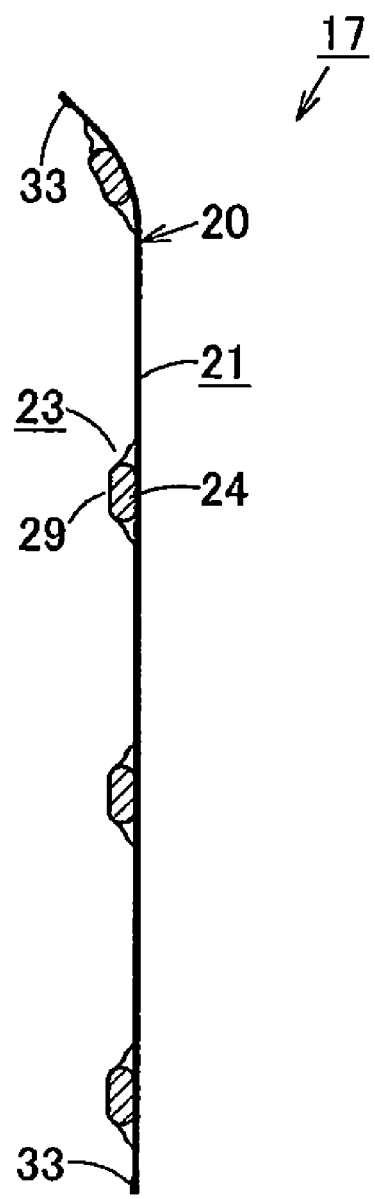
FIG. 4 is a sectional view taken along the line IV-IV of FIG. 3.
Figure 5:
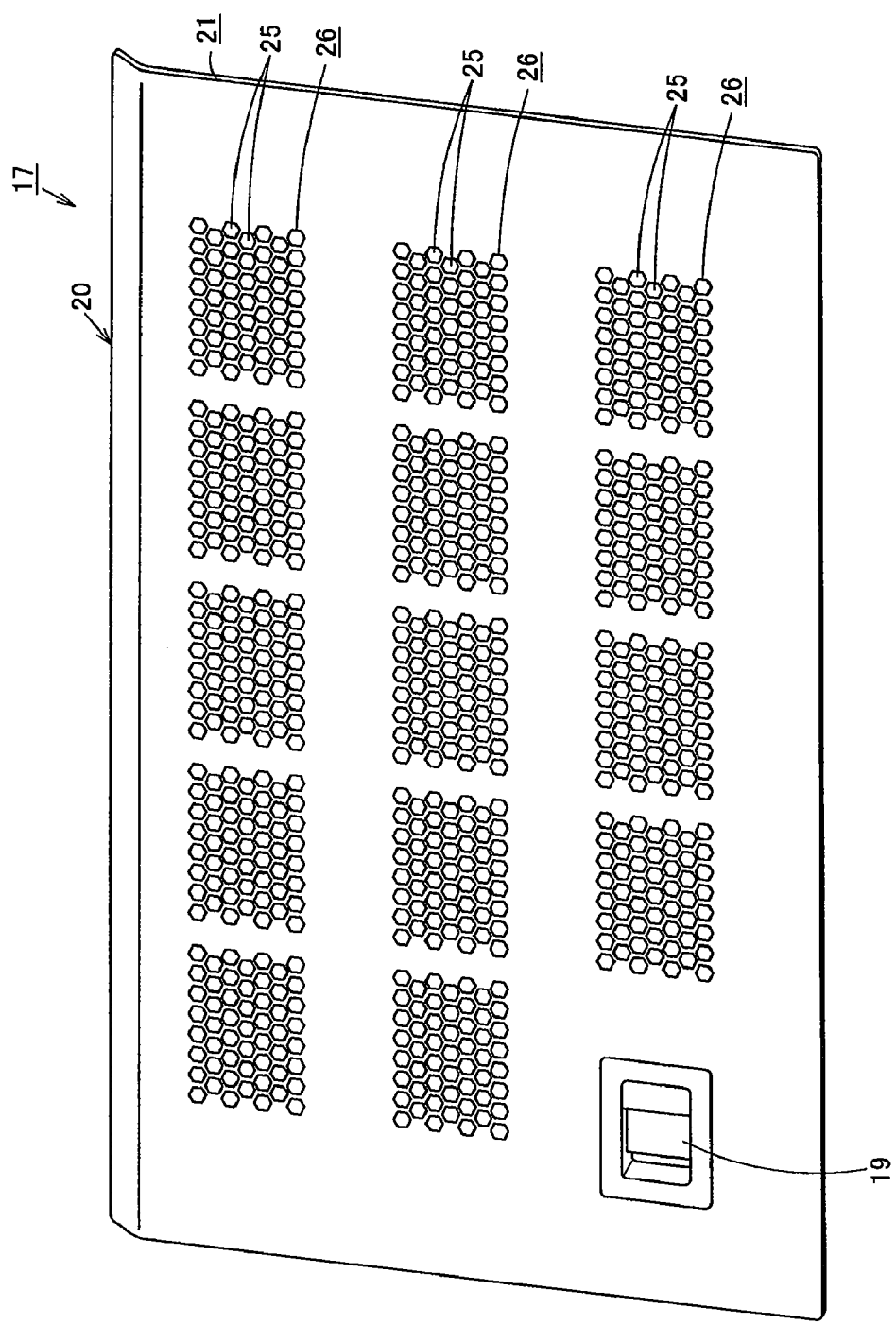
FIG. 5 is a perspective view of the outer face of the door panel.
Figure 6:
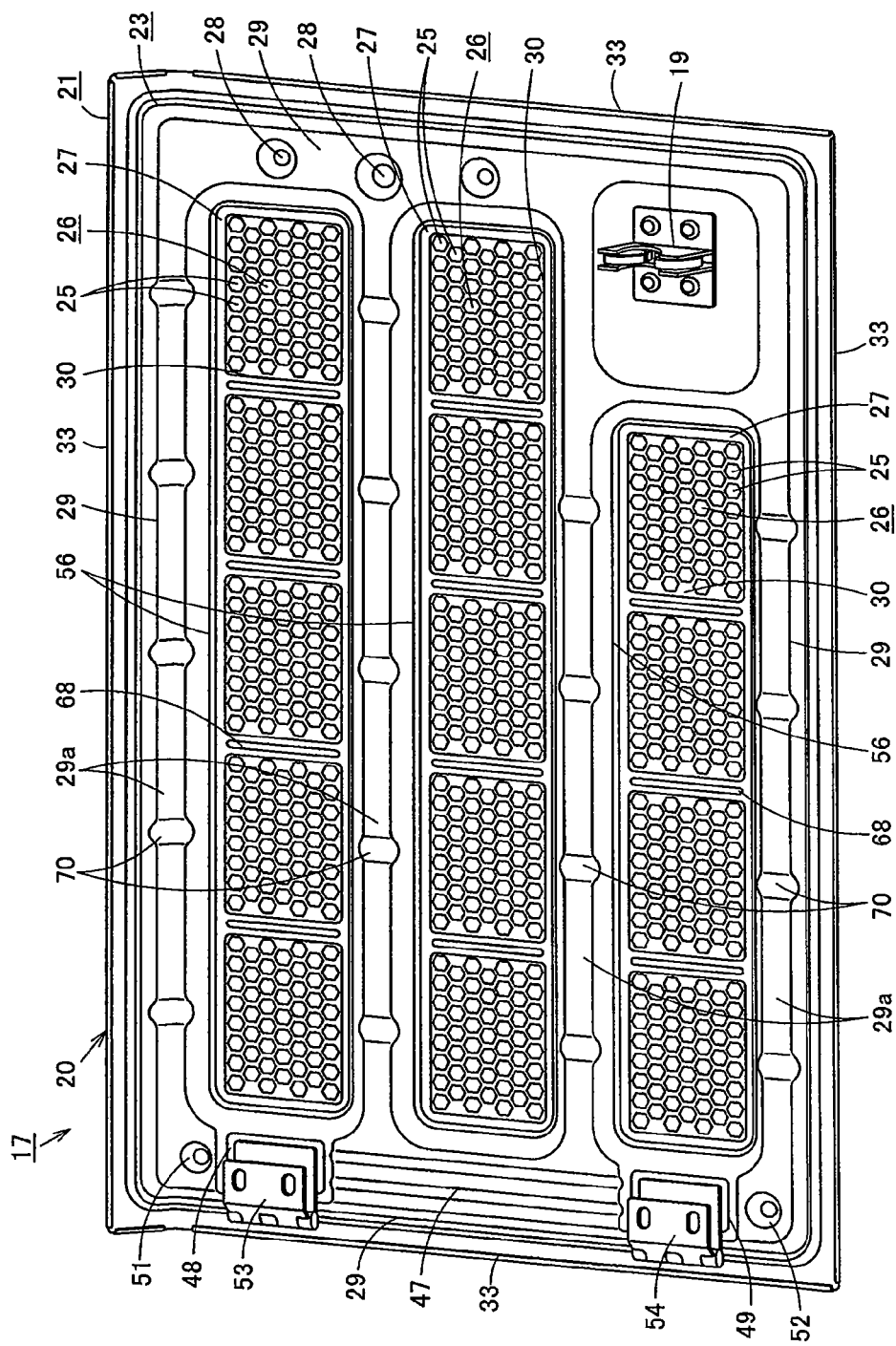
FIG. 6 is a perspective view of the inner face of the door panel.
Figure 7:
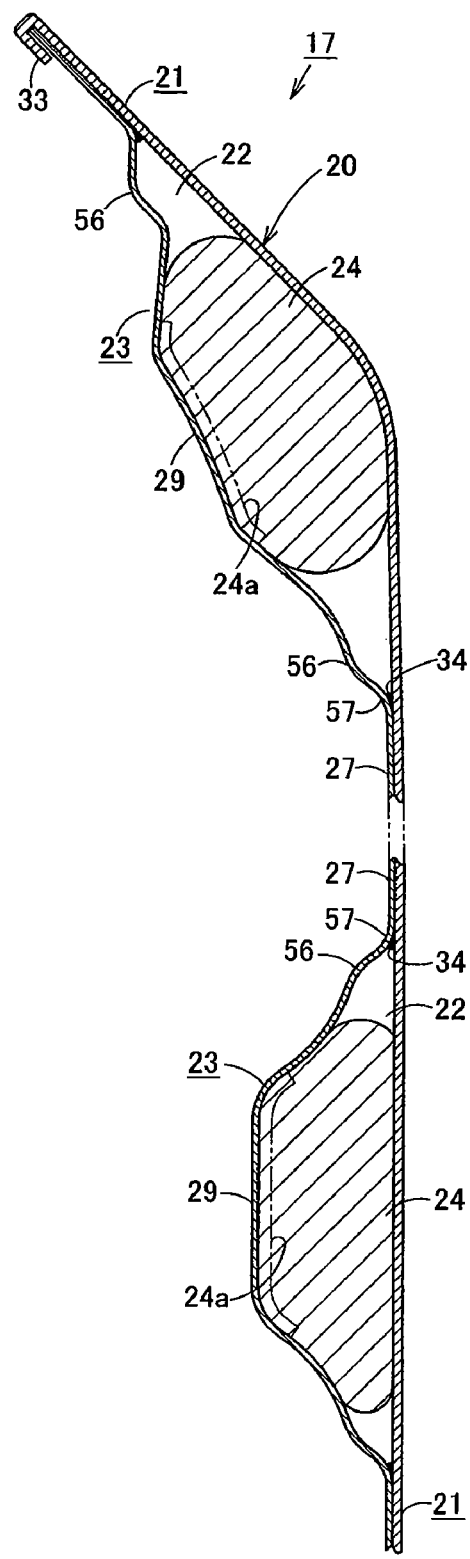
FIG. 7 is an enlarged sectional view of the door panel.

FIGS. 3 to 7 illustrate a door panel 20 of one of the side doors 17. As illustrated in FIGS. 4 and 7, the door panel 20 includes an outer panel 21, an inner panel 23, and a foamed material 24. The inner panel 23 is formed by means of press molding so as to have an uneven surface with recessed portions and raised portions. The recessed portions are fixed to the inner surface of the outer panel 21, and a space 22 is formed between the raised portions and the inner surface of the outer panel 21 and filled with the aforementioned foamed material 24.

The outer panel 21 has a thickness ranging from 1.2 to 5.0 times that of the inner panel 23. In other words, an iron plate that is thinner than the outer panel 21 is used to form the inner panel 23. For example, if the outer panel 21 is an iron plate with a thickness of 1.2 mm, it is desirable to use a thin iron plate with a thickness of, for example, 0.6 or 0.8 mm to form the inner panel 23 in order to obtain sufficient strength and workability, which are reciprocal properties.

As illustrated in FIG. 7, the foamed material 24 is formed by heating an unactivated foaming sheet of a foaming material 24a, which is attached to the inner surface of the inner panel 23, so that the heated foaming material 24a is activated and expands inside the space 22 between the outer panel 21 and the inner panel 23. A highly expandable foaming rubber-base sound absorbing material that has an approximately 20-fold volumetric thermal expansion coefficient may desirably be used as the foaming material 24a. It is desirable to conduct the heating of the foaming material 24a during the baking finish process using a baking finish heating apparatus.

As illustrated in FIGS. 3 and 5, the outer panel 21 has a plurality of honeycomb ventilation hole sections 26 serving as ventilation hole clusters, each of which includes a plurality of regular hexagonal ventilation holes 25 that are formed through the material of the outer panel 21 so as to be arranged in a honeycomb pattern.

As illustrated in FIG. 6, the inner panel 23 has adhering portions 27,28, which are the aforementioned recessed portions joined to the inner surface of the outer panel 21, and a raised portion 29 bulging from the adhering portions 27,28.

Of the adhering portions 27 of the inner panel 23, those surrounded by the raised portion 29 include three laterally extending rows, which are provided at locations respectively corresponding to the rows of the honeycomb ventilation hole sections 26 of the outer panel 21. Each one of these laterally extending adhering portion 27 is provided with ventilation openings 30, each of which is larger than each honeycomb ventilation hole section 26 of the outer panel 21.

To be more specific, a plurality of ventilation openings 30 are formed in the adhering portions 27 that are surrounded by the raised portion 29 and serve as a part of the recessed portions of the inner panel 23. Each ventilation opening 30 corresponds to and is slightly larger than each respective honeycomb ventilation hole section 26 of the outer panel 21.

Figure 8:
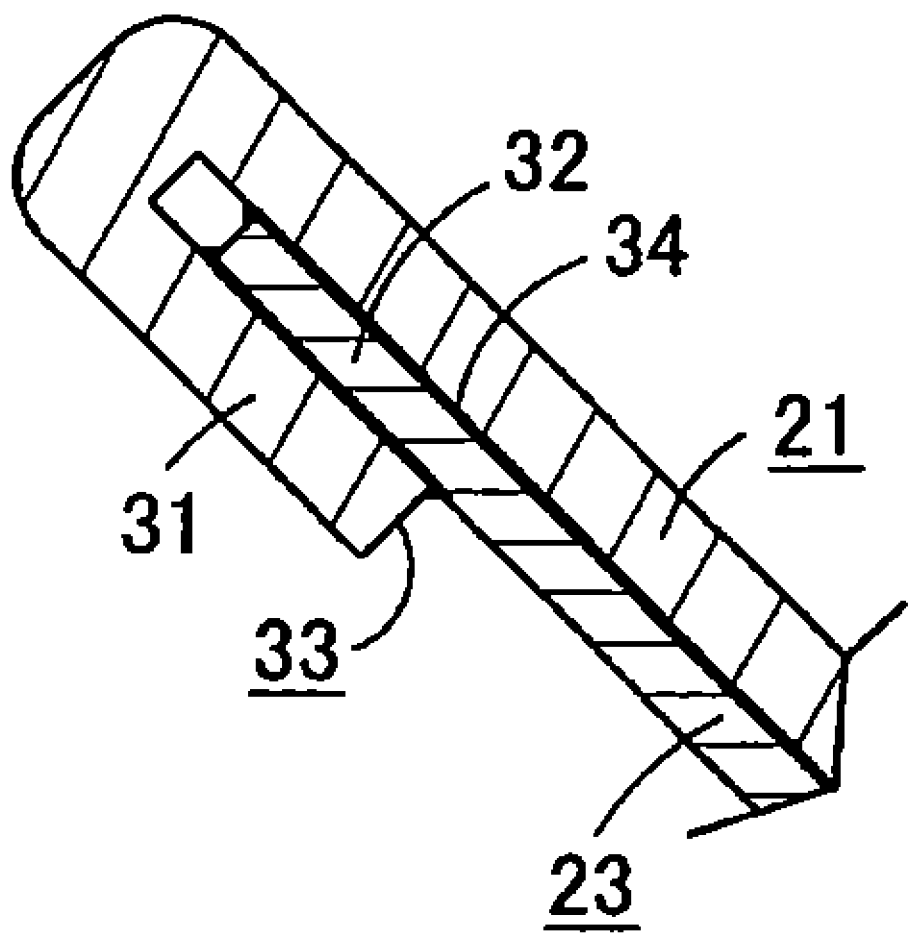
FIG. 8 is a sectional view of a hemmed portion of the door panel.
Figure 9:
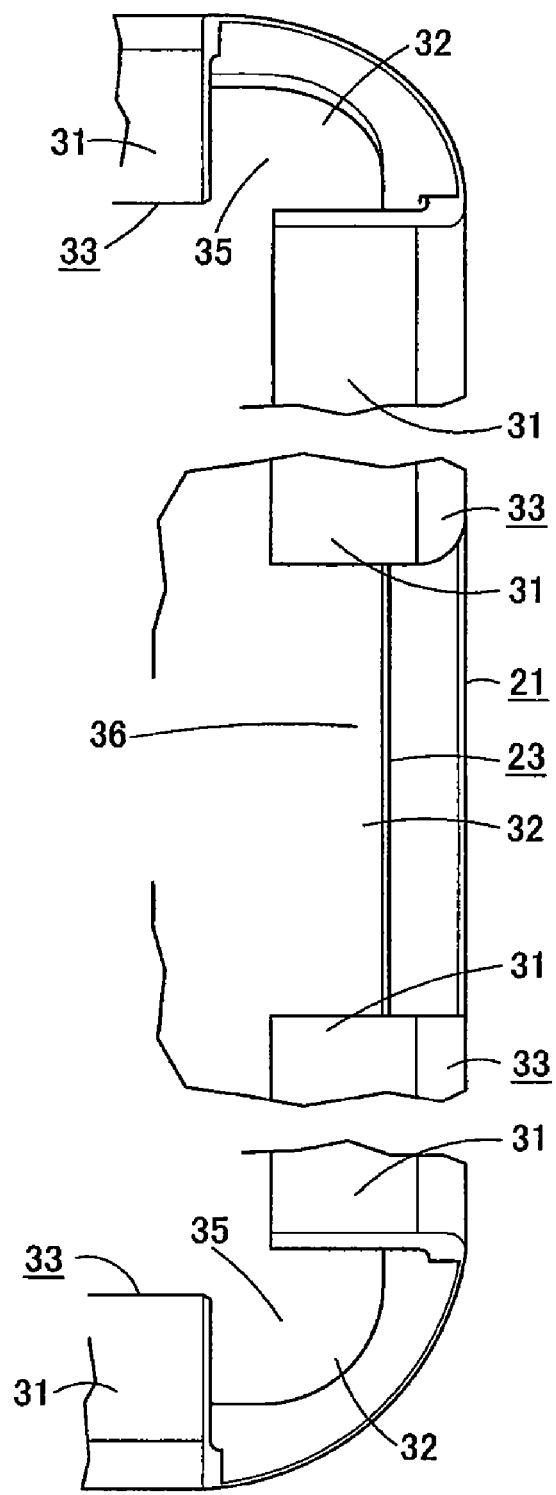
FIG. 9 is an internal view of the hemmed portion of the door panel.
Figure 10:
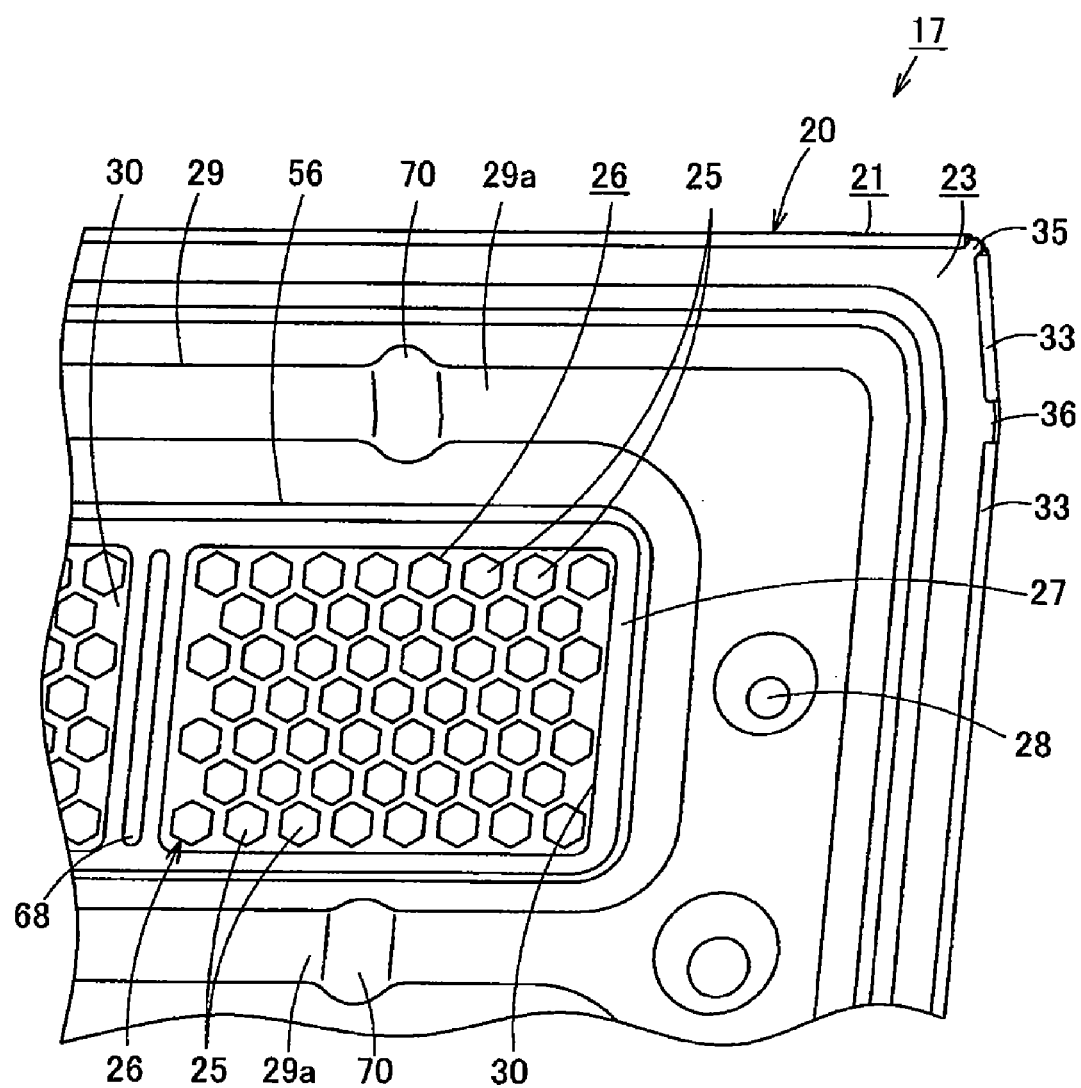
FIG. 10 is an enlarged perspective view of the inner face of the door panel.

As illustrated in FIGS. 8 to 10, the peripheral edge 31 of the outer panel 21 is hemmed by folding the peripheral edge 31 of the outer panel 21 so as to curl over the peripheral edge 32 of the inner panel 23 and then pressing down the folded part. In other words, the outer panel 21 has a hemmed portion 33 that is formed by folding the peripheral edge 31 of the outer panel 21 so as to curl over the peripheral edge 32 of the inner panel 23 and then pressing down the folded part substantially flat so that the peripheral edge 31 of the outer panel 21 interlockingly secures the peripheral edge 32 of the inner panel 23.

As illustrated in FIG. 8, at least the peripheral edge 32 of the inner panel 23 is bonded to the outer panel 21 with an adhesive 34, which joins as well as seals the outer panel 21 and the inner panel 23 together at the hemmed portion 33. The adhesive 34 may desirably be a paste-type structural adhesive having both viscous and thermosetting properties.

As illustrated in FIGS. 9 and 10, the peripheral edge 31 of the outer panel 21 is provided with corner notches 35 and intermittent folded portion notches 36, each of which is formed by partially cutting away the folded part of a corner or an intermittent folded portion of the peripheral edge 31, respectively. The corner portions of the inner panel 23 that correspond to the corner notches 35 of the outer panel 21 are rounded.

Figure 11:
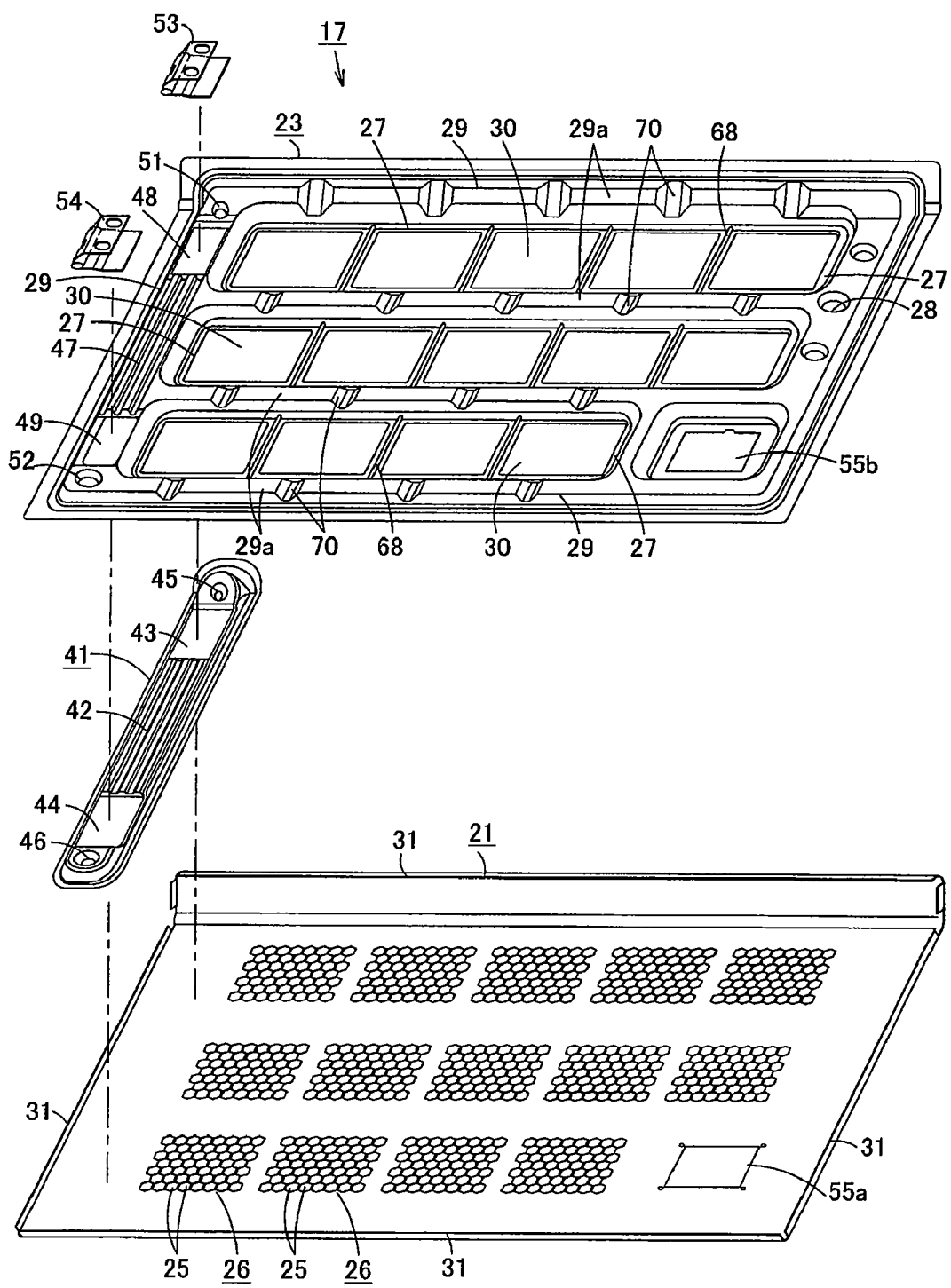
FIG. 11 is an exploded perspective view of the door panel.

FIG. 11 is an exploded perspective view of the side door 17, illustrating how an internal reinforcing plate 41 for mounting hinges is affixed. To be more specific, the internal reinforcing plate 41 is sandwiched between the outer panel 21 and the inner panel 23 in the state where the inner panel 23 is positioned on and affixed to the inner surface of the outer panel 21.

The internal reinforcing plate 41 is provided at the middle portion thereof with a corrugated adhering portion 42 including alternating ridges and furrows. Hinge mounting surface portions 43, 44 are respectively formed continuously with one end and the opposing end of the corrugated adhering portion 42. A positioning fitting portion 45 and a positioning fitting portion 46, both of which have a concave shape, are formed adjacent to the hinge mounting surface portions 43, 44, respectively.

At the location corresponding to the internal reinforcing plate 41, the inner panel 23 is provided with a corrugated adhering portion 47 including alternating ridges and furrows. The corrugated adhering portion 47 is formed at the middle part of the hinge-attaching end of the raised portion 29 of the inner panel 23. Hinge mounting openings 48, 49 are respectively formed adjacent to one end and the opposing end of the corrugated adhering portion 47. A positioning fitting portion 51 and a positioning fitting portion 52, both of which are in the shape of a protrusion protruding downward, are formed adjacent to the hinge mounting openings 48, 49, respectively.

The two positioning fitting portions 45, 46 of the internal reinforcing plate 41 have different dimensions, and, correspondingly, the positioning fitting portions 51, 52 of the inner panel 23, too, have different dimensions. The positioning fitting portion 45 and the positioning fitting portion 51, which are respectively formed at mutually corresponding locations on the internal reinforcing plate 41 and the inner panel 23, fit to each other in a male-female engagement. The positioning fitting portion 46 and the positioning fitting portion 52, which are respectively formed at another pair of mutually corresponding locations on the internal reinforcing plate 41 and the inner panel 23, fit to each other in a male-female engagement.

When the internal reinforcing plate 41 is positioned on and fitted to the inner panel 23, the corrugated adhering portion 42 of the internal reinforcing plate 41 is brought into direct contact with the reverse surface of the corrugated adhering portion 47 of the inner panel 23, to which an adhesive is applied, and the hinge mounting surface portions 43, 44 of the internal reinforcing plate 41 are aligned with the hinge mounting openings 48, 49 of the inner panel 23 so that hinges 53, 54 can be respectively welded to the hinge mounting surface portions 43, 44 of the internal reinforcing plate 41 through the hinge mounting openings 48, 49.

As illustrated in FIG. 11, mounting holes 55a, 55b for mounting a latching device are formed in the outer panel 21 and the inner panel 23, respectively.

Figure 12:
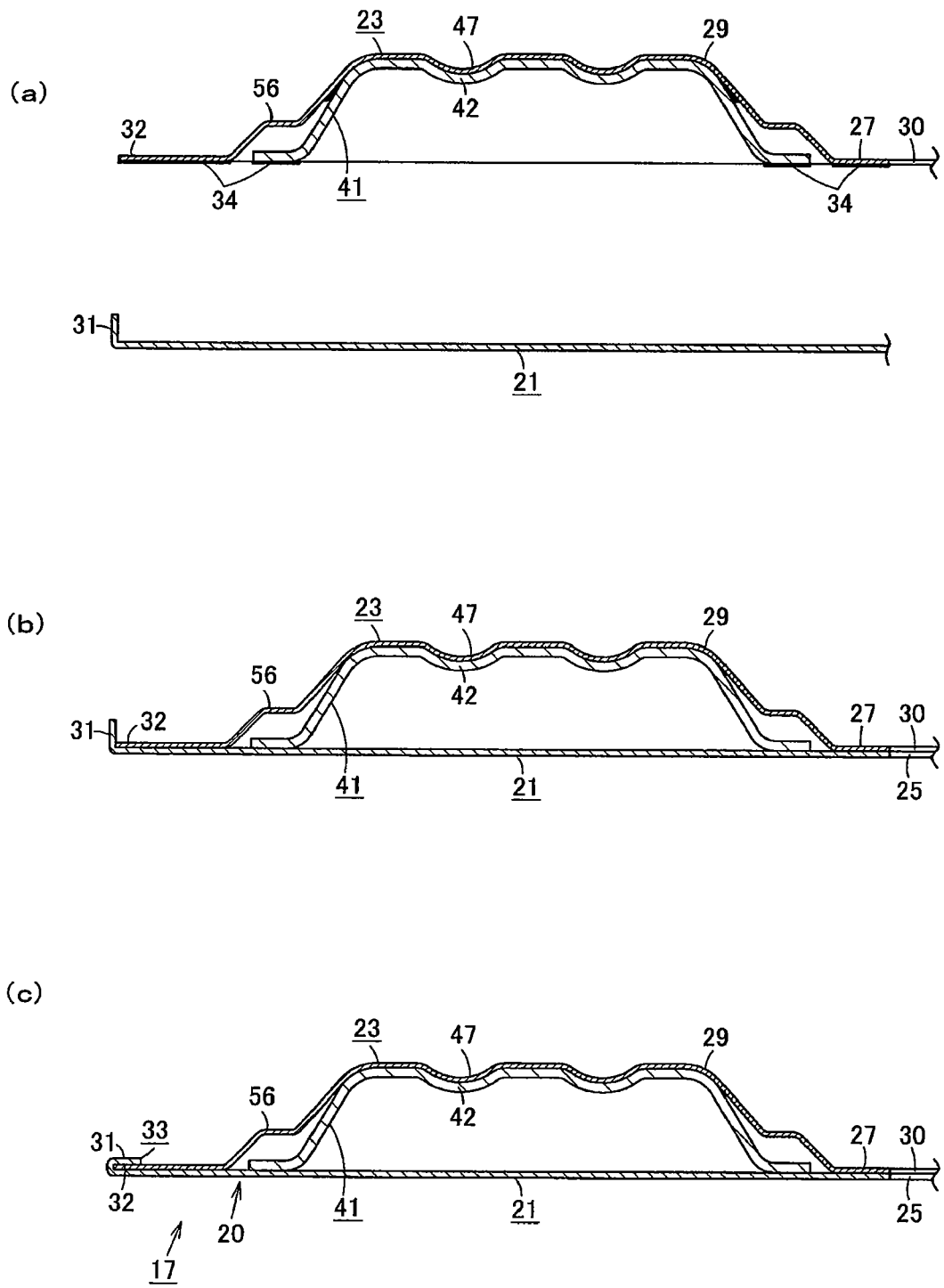
FIG. 12 shows sectional views illustrating the mounting process of an internal reinforcing plate of the door panel, wherein (a) is a sectional view illustrating the internal reinforcing plate positioned in the inner panel and bonded thereto; (b) is a sectional view illustrating how the internal reinforcing plate and the inner panel are positioned in the area surrounded by the peripheral edge of the outer panel in the hemming process; and (c) is a sectional view illustrating how the internal reinforcing plate and the inner panel are immovably joined to the outer panel by hemming the outer panel.

FIG. 12 illustrates a method of producing the door panel 20 incorporating the internal reinforcing plate 41. The inner panel 23 includes the raised portion 29, which is the portion bulging away from the outer panel 21. As illustrated in FIG. 10 (a), the internal reinforcing plate 41 is positioned inside the raised portion 29 of the inner panel 23 and bonded thereto by means of the adhesive applied to the corrugated adhering portions 42, 47. The adhesive is the thermosetting adhesive 34 and also applied to the joint surfaces of the internal reinforcing plate 41 and the inner panel 23 to be joined to the outer panel 21. As illustrated in FIG. 10 (b), in the state where the peripheral edge 31 of the outer panel 21 is folded but still open as the hemming process is not yet completed, and the adhesive has been applied to the inner panel 23, the inner panel 23 and the internal reinforcing plate 41 are positioned on the outer panel 21 by fitting the inner panel 23 in the area surrounded by the peripheral edge 31 of the outer panel 21 so that the internal reinforcing plate 41 is sandwiched between the outer panel 21 and the inner panel 23. Then, as illustrated in FIG. 10 (c), the inner panel 23 and the internal reinforcing plate 41 are immovably joined to and sealed along the inner surface of the outer panel 21 by hemming the peripheral edge 31 of the outer panel 21 so that the peripheral edge 31 is folded while curling over the peripheral edge 32 of the inner panel 23.

As illustrated in FIG. 12, the inner panel 23 includes the raised portion 29 bulging from the recessed adhering portions 27, which are in direct contact with the outer panel 21. A reinforcing deformed portion 56 is formed in a step-like shape along the middle of each sloping side of the raised portion 29. The adhering portions 27 of the inner panel 23 are bonded to the outer panel 21 with the adhesive 34. As illustrated in various drawings including FIGS. 6 and 10, the raised portion 29 and each reinforcing deformed portion 56 are formed in an endless manner along the recessed adhering portions 27.

Figure 1:
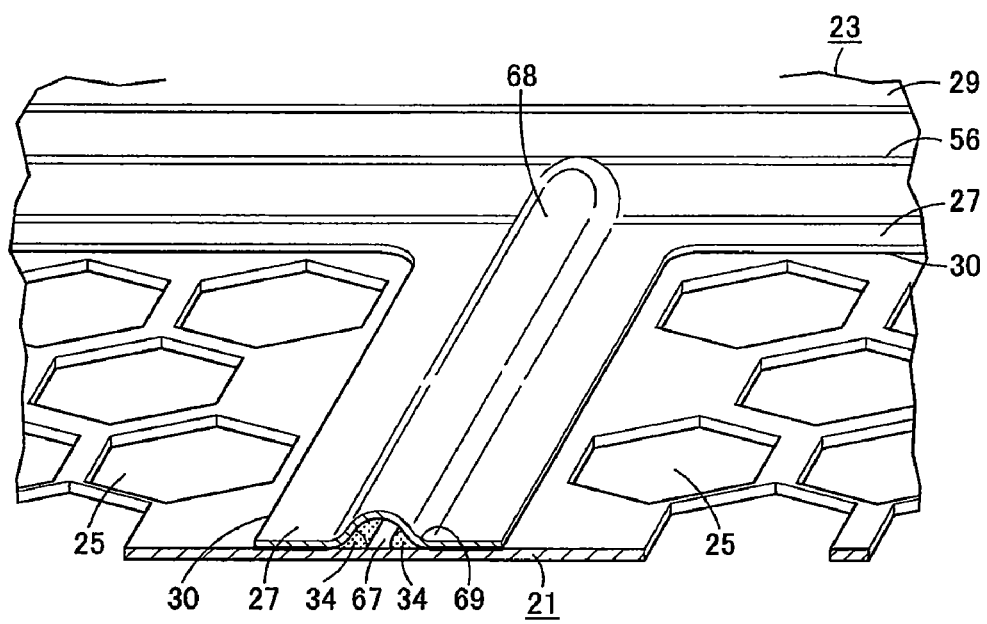
FIG. 1 is a partially cutaway perspective view of an inner panel of a door panel according to an embodiment of the present invention, illustrating in a partially cutaway state an adhesive retaining portion, which is formed on the inner panel.

As illustrated in FIG. 1, the adhering portions 27 of the inner panel 23, which are bonded to the outer panel 21 with the adhesive 34, are provided with adhesive retaining portions 68, each of which includes an adhesive retaining channel 67 for retaining the adhesive 34.

Each adhering portion 27 surrounded by the raised portion 29 includes vertically extending portions extending along the ventilation openings 30, which are formed at locations corresponding to the groups of ventilation holes 25 of the outer panel 21, and the adhesive retaining portions 68 of the inner panel 23 are formed in the shape of a continuously extended raised portion respectively in these vertically extending portions and extend along the ventilation openings 30. To be more specific, each vertically extending portion of the adhering portions 27 extends between a ventilation opening 30 and a ventilation opening 30 adjacent thereto, and each adhesive retaining portion 68 is provided at the middle of each vertically extending portion so as to be flanked by adhesion margins of identical width.

Figure 2:
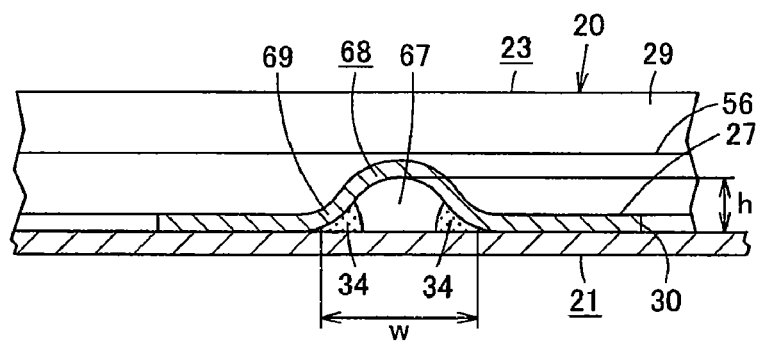
FIG. 2 is a sectional view of the adhesive retaining portion of the door panel.

As illustrated in FIG. 2, the adhesive retaining channel 67 of each adhesive retaining portion 68 has a substantially arc-shaped cross section with dimensions of the height (h) and width (w) being represented by h/w=½ to ¼. In other words, each adhesive retaining portion 68 has rising portions 69 at which the adhesive retaining portion 68 rises from the adhered portion 27. The cross section of each rising portion 69 has a shape of a concave arc, such as a tangent curve. The height h of the cross section may desirably range from approximately 3 to 8 mm.

In order to increase the overall strength, retention of the adhesive 34 is ensured by forming the adhesive retaining portions 68 in the flat adhering portions 27 of the inner panel 23 in such a manner that each adhesive retaining portion 68 has a grooved, rail-like shape so that the adhering surface is concaved. Each adhesive retaining portion 68 is formed in such a size as to be appropriate for making use of the viscosity of the adhesive to facilitate retention of the adhesive. In cases where the door panel 20 includes ventilation openings 30 for high-heat tolerance, the adhesive retaining portions 68 are provided so as to serve as columns. If such is the case, the adhesive retaining portions 68 ensures increased strength over a limited adhering area, and, in addition, the concave shape itself of the adhesive retaining portions 68 contributes to increasing the strength of the inner panel 23.

As illustrated in FIG. 6, the raised portion 29 of the inner panel 23 is so formed as to bulge from the adhering portions 27,28. The raised portion 29 has reinforcing raised portions 29*a*, each of which is a continuously extending raised portion. The reinforcing raised portions 29*a* are provided at the vertical ends of the rows of ventilation openings 30 and extend along the laterally extending adhering portions 27, which are bonded to the outer panel 21. Furthermore, reinforcing indentations 70 are formed across the reinforcing raised portions 29*a*.

Next, a production process of the door panel 20 is explained.

The foaming material 24*a* is attached to the inner surface of the raised portion 29 of the inner panel 23 as illustrated in FIG. 7. As illustrated in FIG. 12(*a*), the internal reinforcing plate 41 for mounting hinges is joined to the reverse surface of the raised portion 29 of the inner panel 23, at a location in the proximity of one of the lateral ends of the inner panel 23, and the thermosetting adhesive 34, which is necessary for bonding the outer panel 21 thereto, is applied to the adhering portions 27, which serve as a part of the recessed portions of the inner panel 23, as well as to the internal reinforcing plate 41. As illustrated in FIG. 12(*b*), the outer panel 21 and the inner panel 23 are positioned and layered one on top of the other. As illustrated in FIG. 12(*c*), the inner panel 23 and the internal reinforcing plate 41 are joined to the inner surface of the outer panel 21 by hemming the peripheral edge 31 of the outer panel 21 so that the peripheral edge 31 is folded while curling over the peripheral edge 32 of the inner panel 23 and the folded parts are pressed down substantially flat.

Thereafter, the inner panel 23 and the internal reinforcing plate 41 are bonded to the outer panel 21 by heating the adhesive 34 using the baking finish heating apparatus. Then, as illustrated in FIG. 7, the foaming material 24*a* is expanded to fill the space 22 with the foamed material 24 by heating using the baking finish heating apparatus to harden the adhesive 34. Furthermore, the paint that has been sprayed beforehand onto the outer surface of the outer and inner panels 21,23 is baked thereon by heating using the baking finish heating apparatus.

For example, thermal hardening of the adhesive 34 is conducted by heating for 5 minutes at 150° C.; formation of the foamed material 24 by expansion by heating for 20 minutes at 150° C.; and baking finish by heating for 20 minutes at 180° C. to 200° C. Such heating can be performed by using a conventional baking finish heating apparatus.

Finally, as illustrated in FIG. 6, hinges 53,54 are respectively welded to the hinge mounting surface portions 43,44 of the internal reinforcing plate 41 through the hinge mounting openings 48,49 of the inner panel 23 by fillet welding or other appropriate method, and a latching device 19 is attached to the mounting holes 55*a* of the outer panel 21 and the mounting holes 55*b* of the inner panel 23.

Next, the functions and effects of the embodiment illustrated in FIGS. 1 to 13 are explained hereunder.

As illustrated in FIG. 7, the hollow structure with a closed cross section formed of the outer panel 21 and the inner panel 23, which is thinner than the outer panel 21, can make the entire door panel 20 lighter. Furthermore, as the closed cross section of this hollow structure has sufficient height, being formed of the inner panel 23 and the outer panel 21 with a thickness greater than that of the inner panel 23, i.e. 1.2 to 5.0 times thicker than the inner panel 23, the door panel has sufficient strength against an external impact. Therefore, the embodiment provides a door panel that is light in weight and has sufficient strength at inexpensive cost.

Furthermore, the foamed material 24 filling the space between the outer panel 21 and the inner panel 23 is capable of absorbing sound and thereby effectively damping sound generated from the door panel itself and, consequently, provides high damping effect to reduce noise.

As illustrated in FIGS. 4 and 6, the inner panel 23 includes recessed adhering portions 27 and a raised portion 29 bulging from the adhering portions 27. Therefore, because of the uneven surface structure formed of the adhering portions 27 and the raised portion 29, the inner panel 23 has increased rigidity and, consequently, increased strength, in spite of being thinner than the outer panel 21.

As illustrated in FIGS. 8 and 9, the hemmed portion is formed by folding the peripheral edge 31 of the outer panel 21 so as to curl over the peripheral edge 32 of the inner panel 23 and then pressing down the folded part. Therefore, even with the outer panel 21 that is thicker than the inner panel 23, the embodiment is capable of providing a hemmed portion 33 with a uniform shape, and thereby providing a folded joint portion having stable quality.

In other words, the hemmed portion 33, at which the peripheral edge of the outer panel 21 interlockingly secures the peripheral edge of the inner panel 23, is formed by folding the peripheral edge of the outer panel 21 so as to curl over the peripheral edge of the inner panel 23 and then pressing down the folded part flat. Therefore, compared with a conventional hemming in which the folded part of the outer panel 21 protrudes in a circular cross section, the hemmed portion 33 of the outer panel 21 results in a stable shape and ensures uniform quality.

In a hemming process, it is not easy to fold the peripheral edge of the outer panel 21 at a corner or an intermittent folded portion of the outer panel 21. According to the present embodiment, however, as illustrated in FIGS. 9 and 10, the outer panel 21 is provided with corner notches 35 and intermittent folded portion notches 36, each of which is formed by partially cutting away the folded part of a corner or an intermittent folded portion of the peripheral edge 31, respectively. Because of these notches, the peripheral edge 31 of the outer panel 21 can be folded and pressed down flat easily and precisely even at the corners and the intermittent folded portions of the outer panel 21.

As illustrated in FIG. 8, the outer panel 21 and the inner panel 23 can assuredly be conjoined by means of bonding with the adhesive 34 and the hemmed portion 33 of the outer panel 21.

As illustrated in FIG. 9, the corner portions of the inner panel 23 that correspond to the corner notches 35 of the outer panel 21 are rounded so that the corner portions of the inner panel 23 are prevented from protruding from the corner notches 35 of the outer panel 21.

As illustrated in FIG. 10, each ventilation opening 30 of the inner panel 23 is larger than each respective honeycomb ventilation hole section 26 of the outer panel 21. Therefore, when the inner panel 23 is conjoined with the inner surface of the outer panel 21, the inner panel 23 is prevented from closing off the honeycomb ventilation hole sections 26 of the outer panel 21 regardless of the dimensional tolerance arising from production of the outer panel 21 and the inner panel 23; in other words, even if the outer panel 21 and the inner panel 23 are not precisely positioned with respect to each other due to dimensional discrepancy resulting from shape tolerance of the press molded products, the honeycomb ventilation hole sections 26 of the outer panel 21 shift only within the range of the respective ventilation openings 30. Therefore, by thus preventing interference with the ventilation aperture area of the outer panel 21 and the inner panel 23, this configuration ensures a prescribed aperture area, and, furthermore, facilitates positioning of the outer panel 21 and the inner panel 23, thereby increasing working efficiency in the manufacturing process.

The plurality of sets of honeycomb ventilation hole sections 26 and ventilation openings 30 ensures a sufficient aperture area for ventilation.

As a result of the configuration described above, for a door panel with a double-panel structure including an outer panel 21 and an inner panel 23, by grouping ventilation holes 25 so as to form densely arranged honeycomb-shaped apertures in the outer panel 21, honeycomb ventilation hole sections 26 with a high aperture area efficiency can be formed at locations respectively corresponding to the limited spaces of the ventilation openings 30 in the inner panel 23. Furthermore, as each honeycomb ventilation hole section 26 is formed by arranging a plurality of regular hexagonal ventilation holes 25 in a honeycomb pattern so that each side of each respective ventilation hole 25 is adjacent to a side of another ventilation hole 25 with a connecting portion therebetween, it is possible to reduce fluid resistance by making the connecting portions between the ventilation holes 25 narrow, while ensuring sufficient strength of these connecting portions. As a result, compared with ventilation hole clusters that are formed of grouped circular or square holes, turbulent flow generated by obstruction of airflow by the connecting portions between the ventilation holes 25 can be reduced.

As illustrated in FIG. 11, as the internal reinforcing plate 41 provided in the raised portion 29, which is the portion of the inner panel 23 raised away from the outer panel 21, is secured between the inner panel 23 and the outer panel 21, the inner panel 23 is reinforced at the raised portion 29 by the internal reinforcing plate 41. A particular feature lies in that the internal reinforcing plate 41 is immovably positioned with respect to the inner panel 23 in a male-female engagement. Therefore, as merely fitting the internal reinforcing plate 41 to the inner panel 23 in a male-female engagement during the production process is sufficient to precisely control the position of the internal reinforcing plate 41, the internal reinforcing plate 41 can precisely be positioned and fixed to a location where reinforcement is most effective.

To be more specific, a male-female engagement of a pair of positioning fitting portions 45,51 and a male-female engagement of another pair of positioning fitting portions 46,52 enable the internal reinforcing plate 41, which has an elongated shape, to be easily and securely positioned to the inner panel 23.

The pair of positioning fitting portions 45,51 differs from the other pair of positioning fitting portions 46,52 in its dimensions. Therefore, should the internal reinforcing plate 41 be position in a wrong orientation, it is impossible to align the positioning fitting portions 45,46 of the internal reinforcing plate 41 with the positioning fitting portions 51,52 of the inner panel 23. This feature ensures the internal reinforcing plate 41, which has a prescribed orientation, to be properly installed in the inner panel 23.

As the hinges 53,54 are respectively welded to the hinge mounting surface portions 43,44 of the internal reinforcing plate 41 through the hinge mounting openings 48,49, which are formed in the inner panel 23, the hinges 53,54 are more solidly affixed, compared with cases where the hinges 53,54 are mounted on the inner panel 23.

As illustrated in FIG. 12, in the state where the peripheral edge 31 of the outer panel 21 is folded but still open as the hemming process is not yet completed, and the adhesive has been applied to the inner panel 23, the inner panel 23 and the internal reinforcing plate 41 are positioned on the outer panel 21 by fitting the inner panel 23 in the area surrounded by the peripheral edge 31 of the outer panel 21, with the internal reinforcing plate 41 sandwiched between the outer panel 21 and the inner panel 23. Then, the inner panel 23 and the internal reinforcing plate 41 are secured to the inner surface of the outer panel 21 by hemming the peripheral edge 31 of the outer panel 21 so that the peripheral edge 31 is folded while curling over the peripheral edge 32 of the inner panel 23. This configuration can provide a door panel production method that ensures, by means of the internal reinforcing plate 41, that the inner panel 23, which is formed in an uneven surface protruding away from and recessed towards the outer panel 21, has sufficient strength at its raised portion 29, while making effective use of the peripheral edge 31 of the outer panel 21 for positioning the inner panel 23 when the hemming process is not yet completed.

As illustrated in FIG. 7, the hollow structure with a closed cross section formed of the outer panel 21 and the inner panel 23 ensures sufficient strength. Furthermore, the inner panel 23 includes the raised portion 29 bulging from the adhering portions 27, which are in direct contact with the outer panel 21. A stepped reinforcing deformed portion 56 is formed along the middle of each sloping side of the raised portion 29. Therefore, the strength of the inner panel 23 is increased compared with a door panel that is not provided with such a stepped portion, resulting in improvement of the strength of the entire door panel.

As illustrated in FIG. 6, the adhering portions 27, and the raised portion 29 and the reinforcing deformed portions 56, which are formed in an endless manner along the adhering portions 27, reinforce each other and thereby increase the strength of the entire inner panel 23.

As illustrated in FIGS. 1 and 2, the adhering portions 27 of the inner panel 23, which are bonded to the outer panel 21 with the adhesive 34, are provided with adhesive retaining portions 68, each of which includes an adhesive retaining channel 67 for retaining the adhesive 34. When the inner panel 23 is pressed against the outer panel 21, the adhesive 34 forced out from between the outer panel 21 and the adhering portions 27 of the inner panel 23 remains in the adhesive retaining channels 67 of the adhesive retaining portions 68. Therefore, when the adhesive 34 hardens, the adhering strength of the adhesive 34 is maintained.

In cases where the door panel 20 is used as a side door, the adhesive retaining portions 68, which extend vertically in the vertically extending portions of the adhering portions 27 that are surrounded by the raised portion 29, also serve as vertically extending columns and thereby increase the strength of the door panel 20 to withstand a vertical load.

As the adhesive forced out from between the outer panel 21 and the adhering portions 27 is evenly retained in the adhesive retaining portions 68, each of which is provided at the middle of each vertically extending portion of the adhering portions 27, the adhering portions 27 of the inner panel 23 can uniformly and evenly adhere to the outer panel 21.

In cases where the inner panel 23 is provided with ventilation openings 30 at locations corresponding to the groups of ventilation holes 25 of the outer panel 21 in order to withstand severe heat, the adhesive can be retained in the adhesive retaining portions 68, which are formed in the shape of an extended raised portion and extend vertically between the ventilation openings 30 in the adhering portions 27 that are surrounded by the raised portion 29. Therefore, as the adhering strength of the adhesive 34 is maintained in spite of a limited adhering area, increased strength is ensured. The adhesive retaining portions 68, which are formed in the shape of an extended raised portion and extend vertically between the ventilation openings 30 in the adhering portions 27 that are surrounded by the raised portion 29, also increase the strength of the adhering portions 27 and thereby prevent reduction of the strength around the ventilation openings 30.

As each adhesive retaining channel 67, which has a substantially arc-shaped cross section with dimensions of the height (h) and width (w) being represented by $h/w = 1/2$ to $1/4$, is a flattened space with a limited height, the adhesive 34 that has been forced out from between the outer panel 21 and the adhering portions 27 of the inner panel 23 into the adhesive retaining channels 67 remains where it has been forced and becomes solidified therein. Therefore, the adhering strength of the adhesive 34 is assuredly maintained.

As illustrated in FIG. 2, each rising portion 69 of each adhesive retaining portion 68 has a cross section in the shape of a concave arc, and a slight gap that gradually becomes wider is formed between the outer panel 21 and each rising portion 69 of each adhesive retaining portion 68. As the adhesive 34 readily remains in these gaps formed by the rising portions 69, the adhering strength of the adhesive 34 is assuredly maintained.

As illustrated in FIG. 6, the inner panel 23 includes the adhering portions 27, which are bonded to the outer panel 21. The reinforcing raised portions 29a, each of which is a continuously extending raised portion, extend along the adhering portions 27. While these reinforcing raised portions 29a have a reinforcing function to increase the strength of the inner panel 23 bonded to the outer panel 21, the reinforcing indentations 70, which are indentations formed across the reinforcing raised portions 29a, further enhance the reinforcing function of the reinforcing raised portions 29a. In short, by providing the inner panel 23 with a complicated uneven shape with the reinforcing raised portions 29a and the reinforcing indentations 70, which extend in a direction intersecting the direction in which the reinforcing raised portions 29a extend, the inner panel 23 can be further reinforced.

Next, FIGS. 14 and 15 illustrate another embodiment of the present invention. In short, the embodiment relates to a side door 17 that has neither honeycomb ventilation hole sections 26 of the outer panel 21 nor ventilation openings 30 of the inner panel 23. In the case of the embodiment illustrated in FIGS. 1 to 13, the honeycomb ventilation hole sections 26 of the outer panel 21 and the ventilation openings 30 of the inner panel 23 are provided in order to withstand severe heat. According to this embodiment, the strength of the side door 17 is increased, because the adhering portions 27 of the inner panel 23 are bonded to the reverse surface of the outer panel 21 over a wide area. As the other components and elements, such as the adhesive retaining portions 68, are similar to those of the embodiment illustrated in FIGS. 1 to 13, they are identified with the same reference numerals, and their explanation is omitted herein.

Next, FIGS. 16 and 17 illustrate a further embodiment of the present invention. In short, the embodiment relates to a side door 17 that does not have a stepped reinforcing deformed portion 56, which is provided in the case of the embodiments illustrated in FIGS. 1 to 15. As the other components and elements, such as the adhesive retaining portions 68, are similar to those of the embodiments illustrated in FIGS. 1 to 15, they are identified with the same reference numerals, and their explanation is omitted herein.

Figure 18:
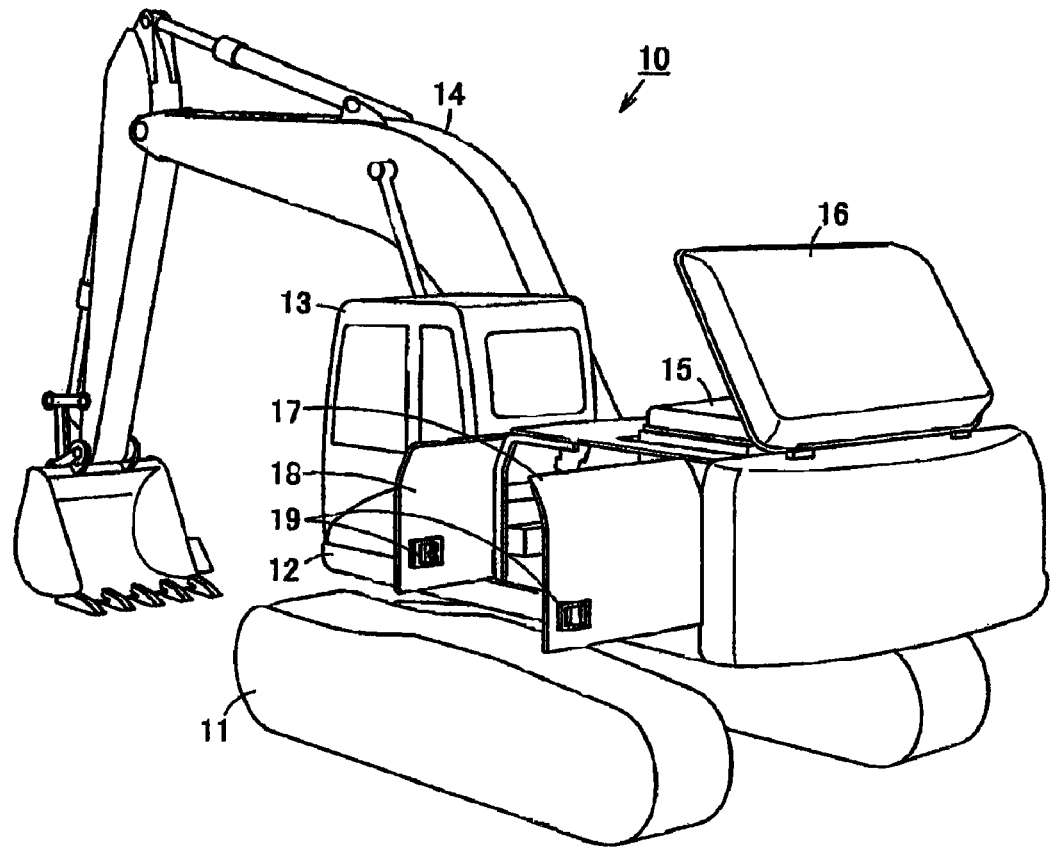
FIG. 18 is a perspective view for schematically illustrating a work machine.

The present invention is applicable to a door panel of a work machine, such as a hydraulic excavator illustrated in FIG. 13 or FIG. 18.

The invention claimed is:

1. A door panel comprising:
an outer panel having a plurality of ventilation holes, and
an inner panel affixed to the inner surface of the outer panel, comprising:
a ventilation opening formed at a location corresponding to the plurality of ventilation holes of the outer panel;
an adhering portion bonded to the outer panel by an adhesive, and
an adhesive retaining portion formed in the adhering portion and having an adhesive retaining channel for retaining the adhesive,
wherein the adhesive retaining portion is formed in the shape of a continuously extended raised portion in the adhering portion and extends vertically along the ventilation opening.

2. The door panel as claimed in claim 1, wherein: the adhering portion of the inner panel includes a vertically extending portion, and the adhesive retaining portion continuously extends in the vertically extending portion of the adhering portion.

3. The door panel as claimed in claim 2, wherein: the adhesive retaining portion is provided at the middle of the vertically extending portion of the adhering portion.

4. The door panel as claimed in claim 1, wherein: the adhesive retaining portion has a rising portion at which the adhesive retaining portion rises from the adhering portion, the rising portion having a cross section in the shape of a concave arc.

5. The door panels claimed in claim 1, wherein: the adhesive retaining portion has a substantially arc-shaped cross section with such dimensions that the proportion of the height to the width thereof is in the range from $1/2$ to $1/4$.

* * * * *